United States Patent
Miller et al.

(10) Patent No.: US 7,181,597 B2
(45) Date of Patent: **\*Feb. 20, 2007**

(54) DECODING INSTRUCTIONS FOR TRACE CACHE RESUME STATE IN SYSTEM PASSING DECODED OPERATIONS TO BOTH TRACE CACHE AND EXECUTION ALLOCATION MODULE

(75) Inventors: John Alan Miller, Portland, OR (US); Stephan Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/217,707

(22) Filed: Aug. 31, 2005

(65) Prior Publication Data

US 2005/0289324 A1 Dec. 29, 2005

Related U.S. Application Data

(62) Division of application No. 10/032,565, filed on Jan. 2, 2002, now Pat. No. 6,950,924.

(51) Int. Cl.
*G06F 9/06* (2006.01)

(52) U.S. Cl. ...................... 712/214; 711/118; 712/205; 712/233

(58) Field of Classification Search ...................... None
See application file for complete search history.

(56) References Cited

U.S. PATENT DOCUMENTS

| 6,055,630 | A * | 4/2000 | D'Sa et al. .................. 712/240 |
| 6,076,144 | A * | 6/2000 | Peled et al. .................. 711/125 |
| 6,453,411 | B1 * | 9/2002 | Hsu et al. ..................... 712/237 |
| 6,721,866 | B2 * | 4/2004 | Roussel et al. ............. 711/201 |

* cited by examiner

*Primary Examiner*—Kenneth S. Kim
(74) *Attorney, Agent, or Firm*—Shireen I. Bacon (57) ABSTRACT

A system and method of managing processor instructions provides enhanced performance. The system and method provide for decoding a first instruction into a plurality of operations with a decoder. A first copy of the operations is passed from the decoder to a build engine associated with a trace cache. The system and method further provide for passing a second copy of the operation from the decoder directly to a back end allocation module such that the operations bypass the build engine and the allocation module is in a decoder reading state.

18 Claims, 7 Drawing Sheets

DECODING INSTRUCTIONS FOR TRACE CACHE RESUME STATE IN SYSTEM PASSING DECODED OPERATIONS TO BOTH TRACE CACHE AND EXECUTION ALLOCATION MODULE

RELATED APPLICATION

This application is a divisional application of patent application Ser. No. 10/032,565, filed on Jan. 2, 2002 now U.S. Pat. No. 6,950,924.

BACKGROUND OF THE INVENTION

1. Technical Field

The present invention generally relates to the management of processor instructions. More particularly, the invention relates to the selective bypassing of a trace cache build engine for enhanced performance.

2. Discussion

In the highly competitive computer industry, the trend toward faster processing speeds and increased functionality is well documented. While this trend is desirable to the consumer, it presents significant challenges to processor designers as well as manufacturers. A particular area of concern relates to the management of processor instructions. In modern day processor architectures, a back end allocation module executes decoded operations, typically termed micro-operations ($\mu$ops), in order to implement the various features and functions called for in the program code. The front end of the processor architecture provides the $\mu$ops to the allocation module, in what is often referred to as an instruction or operation pipeline. Generally, it is desirable to ensure that the front end pipeline remains as full as possible in order to optimize the processing time of the back end allocation module. As the processing speed of the allocation module increases, however, optimization becomes more difficult. As a result, a number of instruction management techniques have evolved in recent years.

Figure 1:
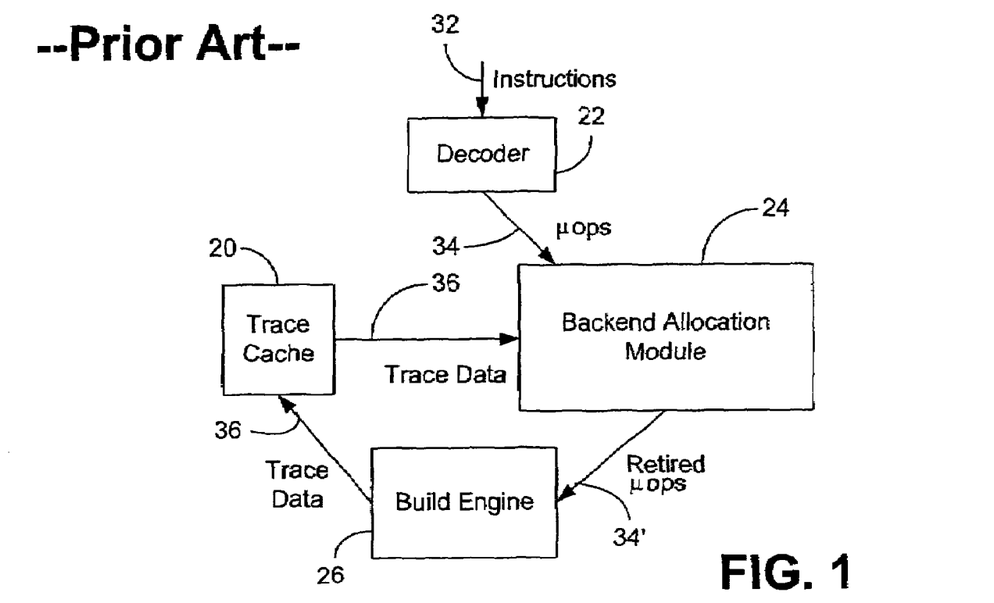
FIG. 1 is a block diagram of a first example of a conventional processor instruction management system, useful in understanding the invention.

FIG. 1 illustrates one such approach to managing processor instructions that involves the use of a trace cache 20. Encoded instructions 32 are provided to a decoder 22, which decodes the instructions 32 into basic $\mu$ops 34 that the execution core in the back end allocation module 24 is able to execute. Since the decoding process has been found to often be a bottleneck in the process of executing instructions, one conventional approach has been to effectively recycle the retired $\mu$ops 34' so that decoding is not always necessary. Thus, the retired $\mu$ops 34' are sent to a build engine 26 in order to create trace data 36. The building of trace data 36 essentially involves the use of branch prediction logic and knowledge of past program execution to speculate where the program is going to execute next. Trace-based instruction caching is described in a number of sources such as U.S. Pat. No. 6,170,038 to Krick, et al. The trace data 36 is written into the trace cache 20. The trace cache 20 is preferred over the decoder 22 as a source of instructions due to the above-described bottleneck concerns. For example, the time required to read from the decoder 22 is often on the order of four times longer than the time required to read from the trace cache 20. Thus, the back end allocation module 24 typically searches for a given $\mu$op in the trace cache 20 first, and resorts to the decoder 22 when the $\mu$op is not found in the trace cache 20 (i.e., a trace cache miss occurs). The difficulty with the above-described "build-at-retirement" approach is that loops in the program code may not be detected by the build engine 26 until after they are useful.

Figure 2:
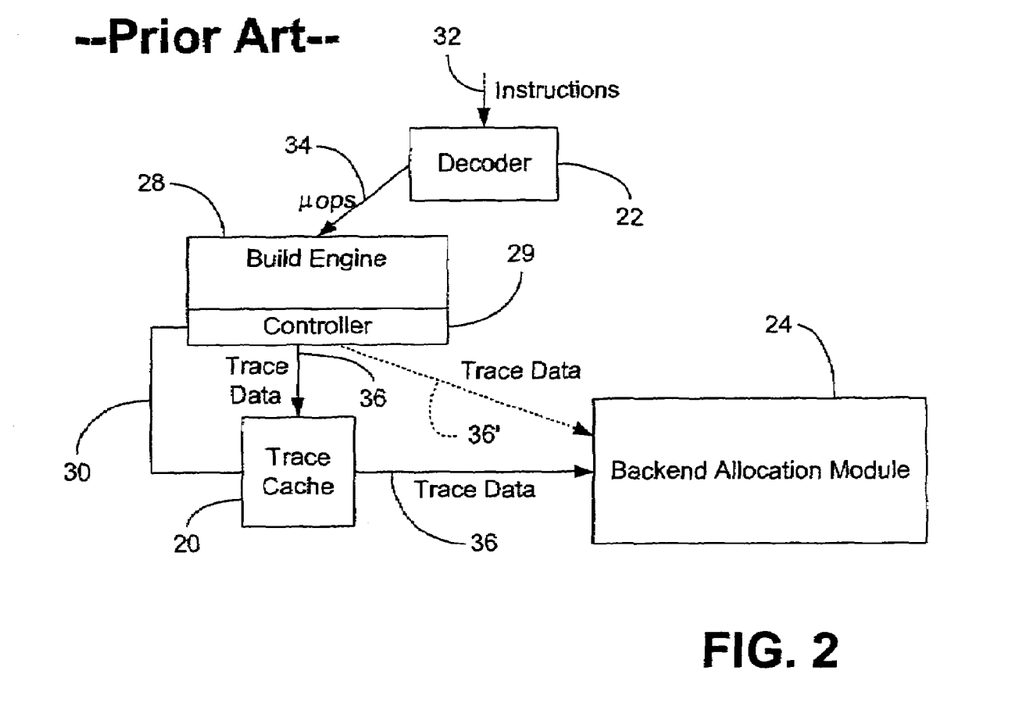
FIG. 2 is a block diagram of a second example of a conventional processor instruction management system, useful in understanding the invention.

FIG. 2 illustrates another conventional approach that addresses the concerns of building at retirement, but also leaves considerable room for improvement. Under this approach, the decoded $\mu$ops 34 are sent directly to a build engine 28 that includes a controller 29 that decides whether to send the trace data directly to the allocation module 24 or to the trace cache 20. Thus, when the controller 29 determines that a trace cache miss has occurred, the trace data 36' can be sent directly to the allocation module 24 in order to reduce latency. The allocation module 24 can therefore be viewed as being switched from a trace cache reading state into a build engine reading state. As trace data 36' is sent to the allocation module 24, the controller 29 can use address line 30 to determine whether it is safe to return to the trace cache read state. Specifically, as $\mu$ops 34 come into the build engine 28, the controller 29 can search the trace cache 20 for the linear instruction pointer (IP) corresponding to each $\mu$op. When a match is made, the controller 29 can re-authorize the transfer of trace data 36 from the trace cache 20 to the allocation module 24. While this approach significantly helps with regard to the detection of program loops, certain difficulties remain. For example, the latency associated with the build engine 28 is part of the $\mu$op pipeline regardless of whether the trace cache 20 is being written to. Indeed, the build engine latency can become critical as build heuristics become more advanced.

BRIEF DESCRIPTION OF THE DRAWINGS

The various advantages of the present invention will become apparent to one skilled in the art by reading the following specification and appended claims, and by referencing the following drawings, in which:

DETAILED DESCRIPTION

Figure 3:
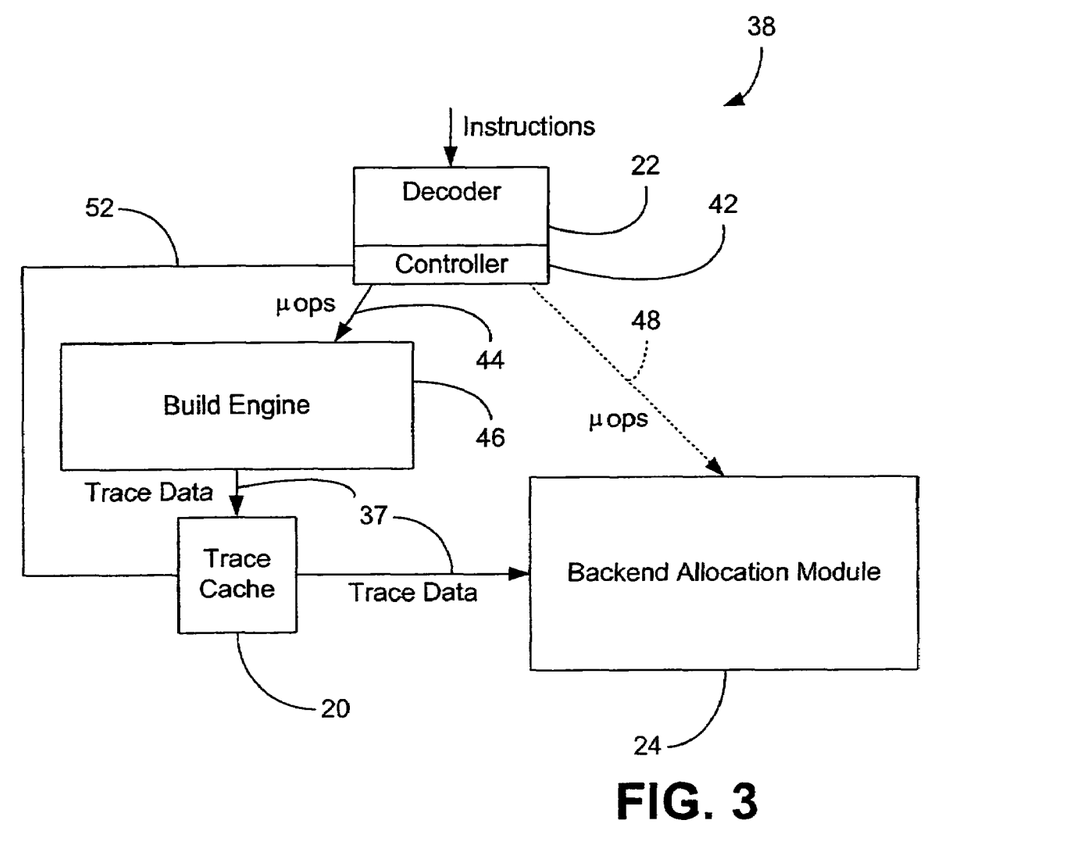
FIG. 3 is a block diagram of an example of a processor instruction management system in accordance with one embodiment of the present invention.

Turning now to FIG. 3, a processor instruction management system 38 is shown. The management system 38 may be implemented in any combination of software and/or hardware known in the art. For example, one approach is to dispose each of the illustrated components on the same processor integrated circuit (chip) in the form of an application specific integrated circuit (ASIC). In other approaches, various ones of the components may reside on separate chips. While the management system 38 will be primarily described with regard to a processor used in a personal computing environment, it should be noted that the invention is not so limited. In fact, the management system 38 can be useful in any circumstance in which instruction throughput efficiency is an issue of concern. Notwithstanding, there are a number of aspects of personal computer (PC) processors for which the management system 38 is uniquely suited.

Generally, the management system 38 includes a decoder 22 to decode a first instruction into a plurality of operations. A controller 42 passes a first copy 44 of the operations from the decoder 22 to a build engine 46 associated with a trace cache 20. It can further be seen that the controller 42 also passes a second copy 48 of the operations from the decoder 22 directly to an allocation module 24 such that the operations bypass the build engine 46 and the allocation module 24 is in a decoder reading state.

It will be appreciated that the controller 42 can include control logic to determine whether a resume condition is present based on a second instruction. The second instruction can be any instruction received subsequent to receiving the first instruction, which caused the allocation module 24 to be placed in the decoder reading state. It should also be noted that the first instruction can be located anywhere in the instruction stream and is given the designation "first" only to distinguish it from the instructions that follow. The second instruction is therefore used as a mechanism of determining whether to return to the trace cache reading state (i.e., whether the resume condition is present). Simply put, the control logic is able to switch the allocation module 24 from the decoder reading state to a trace cache reading state when the resume condition is present. One approach is to search the trace cache 20 via look-up port 52 for an instruction pointer (IP) that corresponds to each following instruction. It should be pointed out that in most cache memories, a data array includes a plurality of data lines, and a tag array includes a plurality of tag entries corresponding to the data lines. Together, the tag entries and the corresponding data lines form cache lines of the trace cache 20. The above approach involves searching the tag array for each IP encountered at the decoder. While such an approach results in a high level of confidence that the trace cache 20 is ready to start providing trace data 37, searching for every instruction requires a relatively large increase to the tag structure used to implement the search of trace cache 20.

Figure 4:
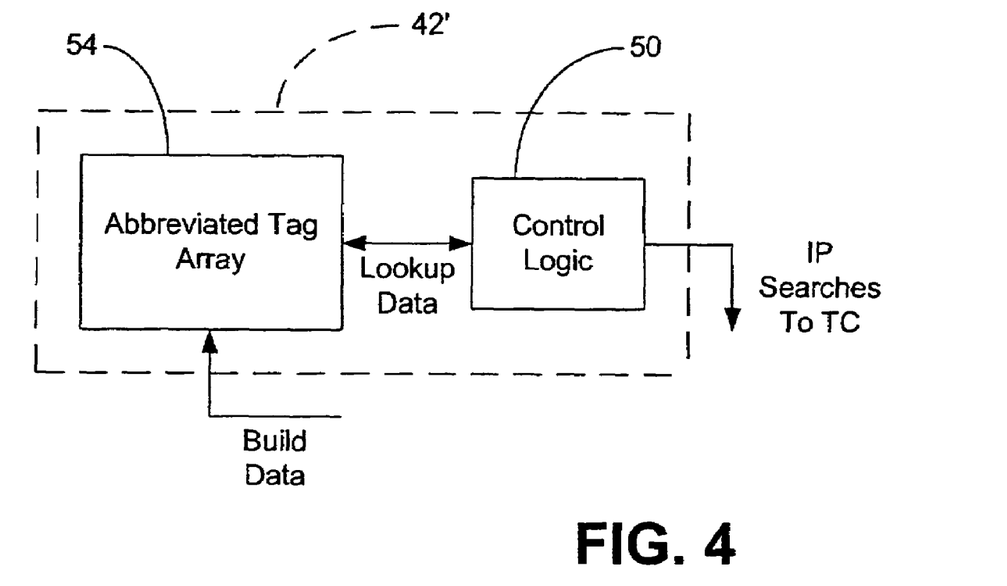
FIG. 4 is a block diagram of an example of a build engine controller in accordance with one embodiment of the present invention.
Figure 5:
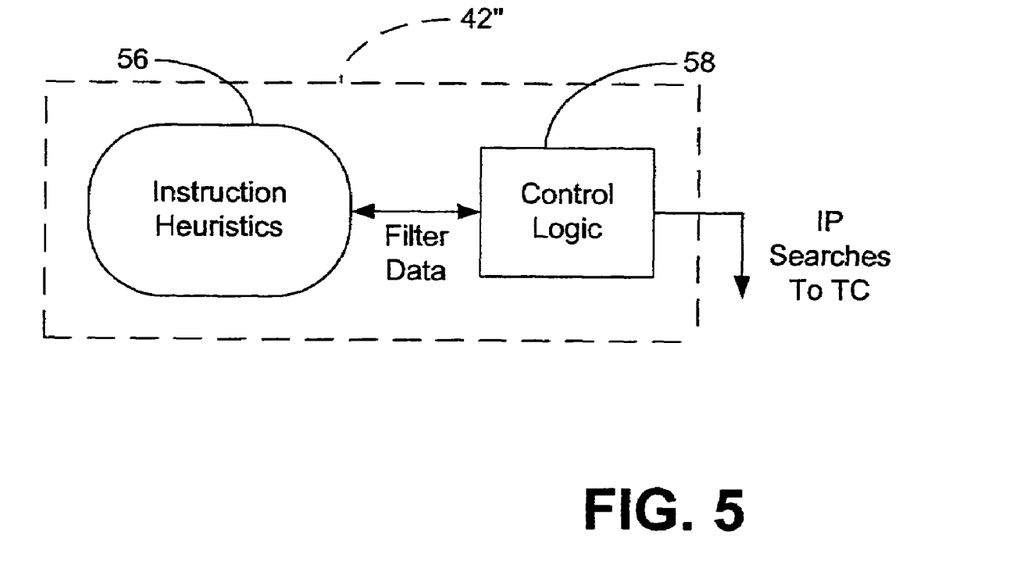
FIG. 5 is a block diagram of an example of a build engine controller in accordance with an alternative embodiment of the present invention.

Thus, FIGS. 4 and 5 illustrate an approach wherein the control logic conducts the searching for a subset of every instruction decoded by the decoder. Specifically, FIG. 4 shows that the controller 42' may further include an abbreviated tag array 54, where the control logic 50 selects the subset based on a look-up to the abbreviated tag array 54. The abbreviated tag array 54 is constructed using build data from the build engine 46 (FIG. 3), and can contain data for the instructions that are most likely to result in a trace cache hit. FIG. 5, on the other hand, illustrates that the controller 42'' may alternatively include instruction heuristics 56, where the control logic 58 selects the subset based on the instruction heuristics 56. An example of a heuristic would be to determine whether the immediately preceding instruction was a branch instruction. If not, it has been determined that the following instruction often results in a trace cache hit. Thus, in either case, if the control logic determines that the second instruction is included in the subset of instructions, the IP search is conducted in the tag array of the trace cache 20 (FIG. 3). Otherwise, the allocation module 24 remains in the decoder reading state and the decoder moves to the next instruction.

It is important to note that the decision of whether to return to the trace cache reading state should be made early enough to hide the trace cache read latency. For example, the trace cache read latency might be five pipeline stages, which means that in many conventional decoders the decision must be made by the end of the first decode stage.

Figure 6:
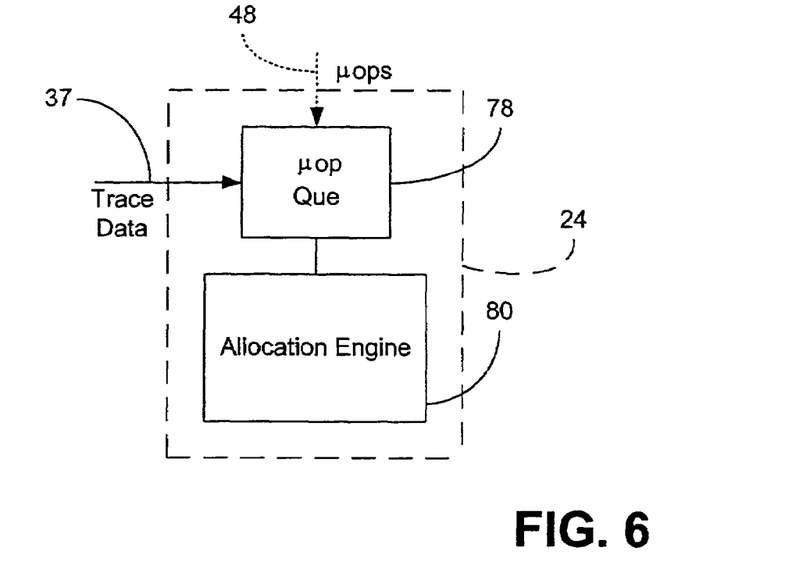
FIG. 6 is a block diagram of an example of a back end allocation module in accordance with one embodiment of the present invention.

FIG. 6 illustrates that one implementation of the back end allocation module 24 includes a μop que 78 and allocation engine 80. The Lop que 78 provides a buffer between the front end discussed above and the allocation engine 80, if so desired.

Figure 7:
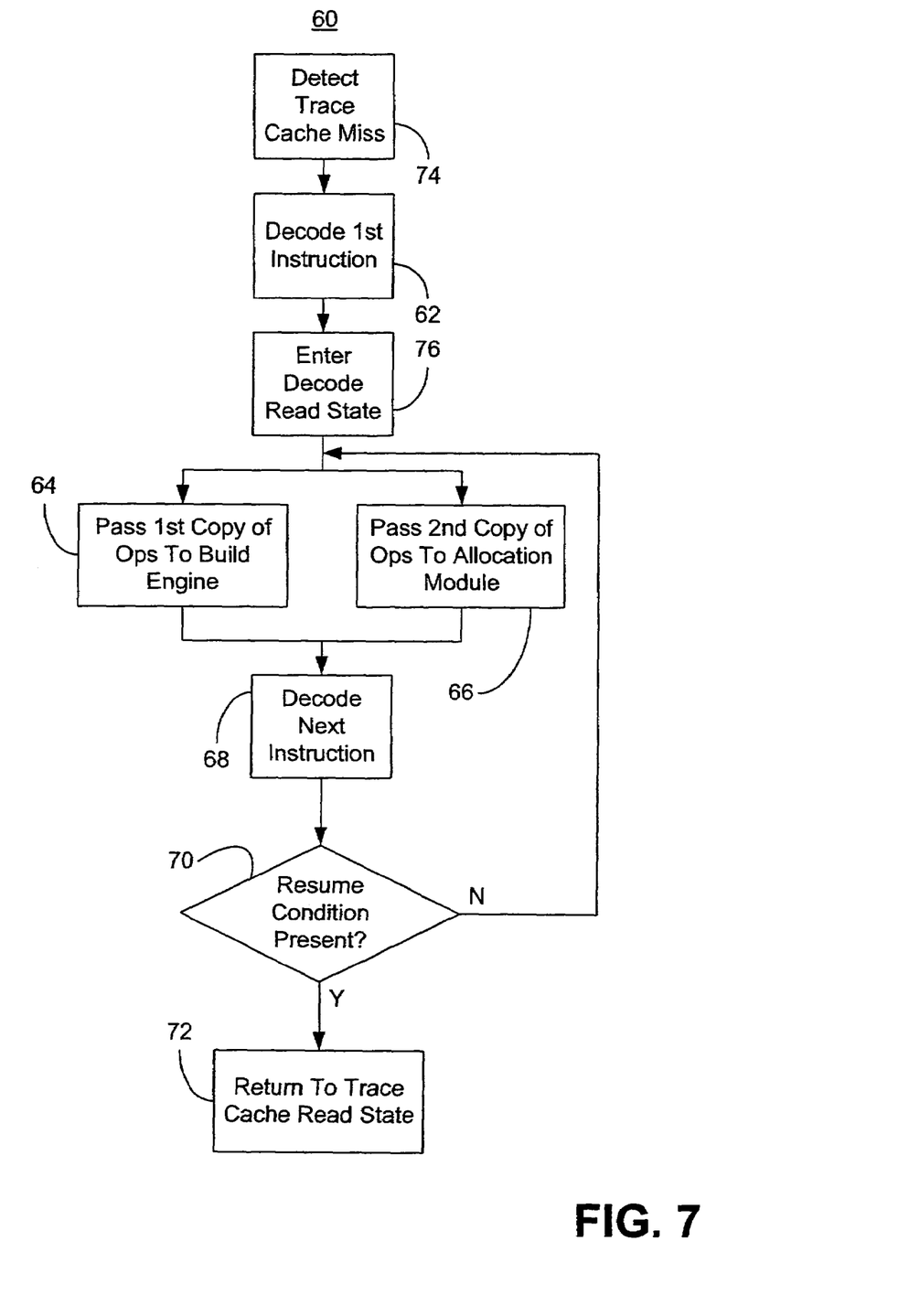
FIG. 7 is a flowchart of an example of a method of managing processor instructions in accordance with one embodiment of the present invention.

Turning now to FIG. 7, a method 60 of managing processor instructions is shown. Generally, it can be seen that a first instruction is decoded into a plurality of operations with a decoder at processing block 62. Processing block 64 provides for passing a first copy of the operations from the decoder to a build engine associated with a trace cache. A second copy of the operations is passed from the decoder directly to a back end allocation module at block 66 such that the operations bypass the build engine and the allocation module is in a decoder reading state. A second instruction is received at block 68 and block 70 provides for determining at the decoder whether a resume condition is present based on the second instruction. It can further been seen that the allocation module is switched from the decoder reading state to a trace cache reading state at block 72 when the resume condition is present. It is important to note that when a trace cache miss is detected at block 74, the allocation module is placed in a decoder reading state at block 76 for at least one instruction.

Figure 8:
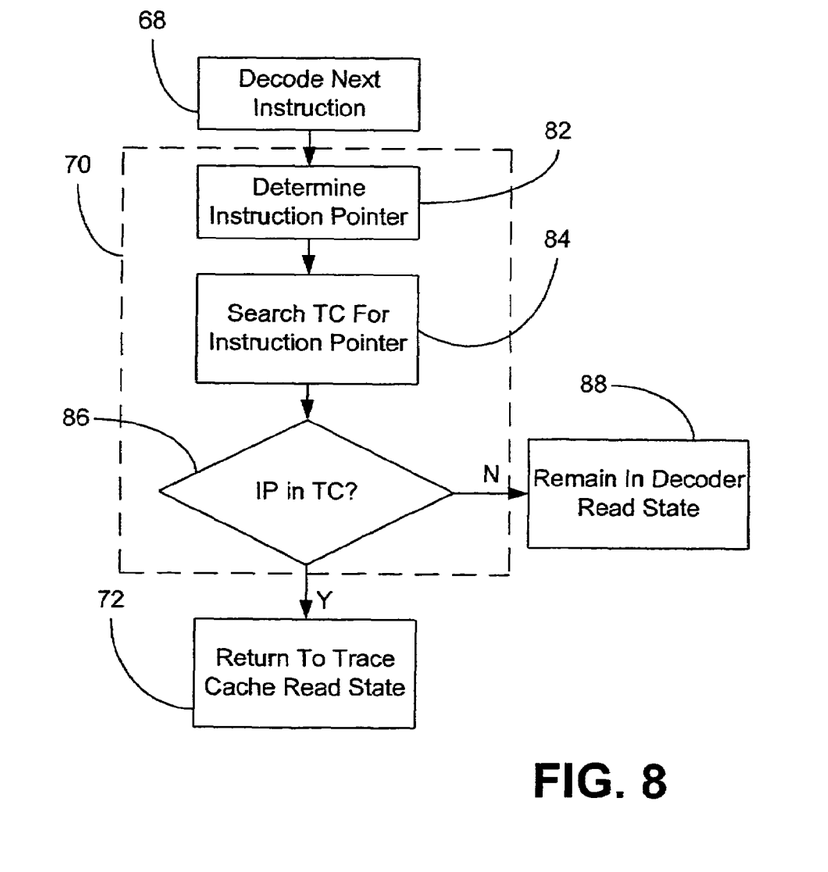
FIG. 8 is a flowchart of an example of a process of determining whether a resume condition is present in accordance with one embodiment of the present invention.

FIG. 8 shows one approach to determining whether a resume condition is present in greater detail at block 70. It can be seen that block 82 provides for determining a linear instruction pointer (IP) for the second instruction. As already discussed, each IP provides a mechanism for addressing traces and trace segments, and the linear IP has been well documented in a number of sources. The trace cache is searched at block 84 for the IP that corresponds to the second instruction. The illustrated embodiment determines whether the IP is in the trace cache at block 86 for every instruction decoded by the decoder. If the IP is not found in the trace cache, the allocation module remains in the decoder reading state at block 88.

Figure 9:
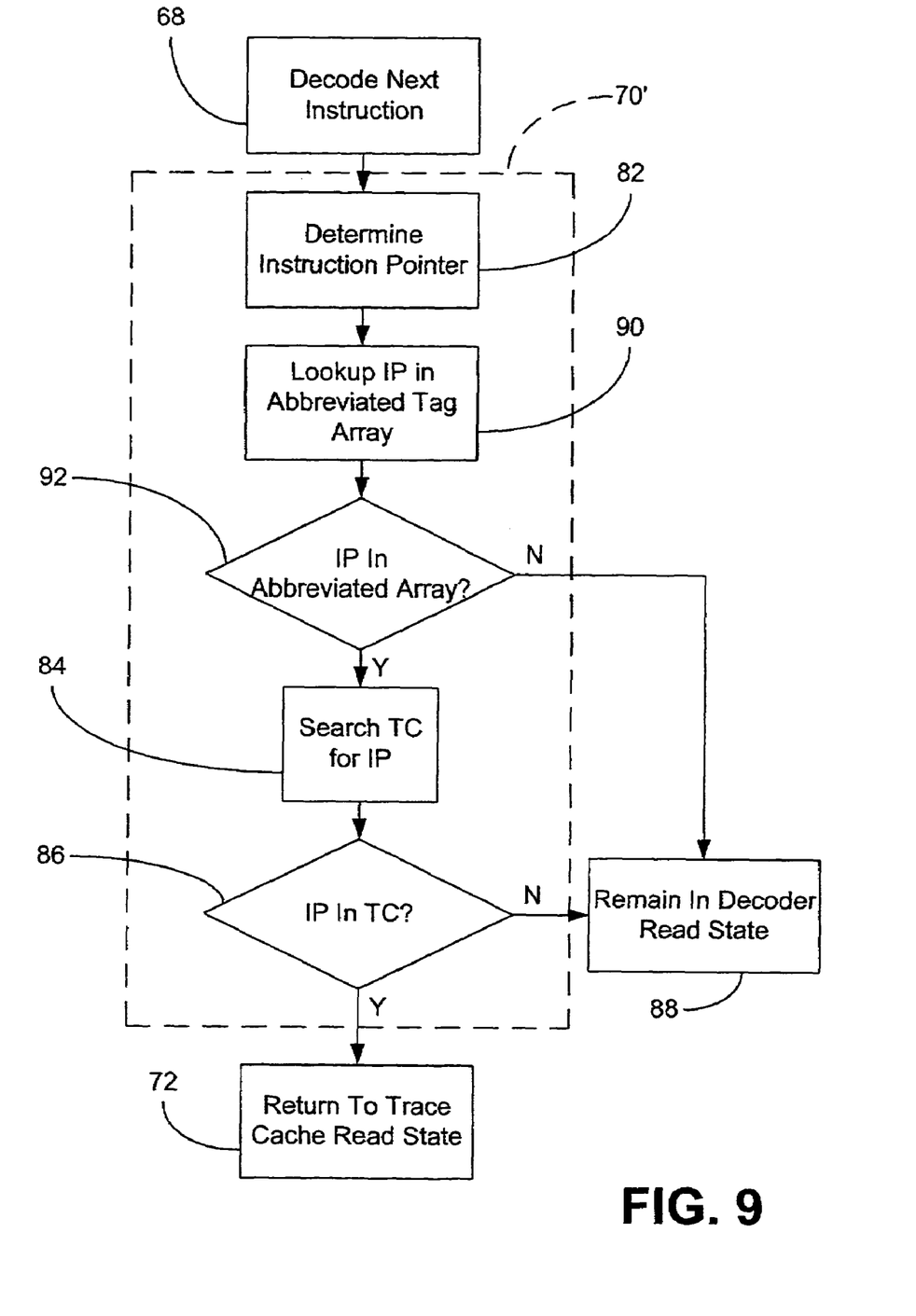
FIG. 9 is a flowchart of an example of a process of determining whether a resume condition is present in accordance with a first alternative embodiment of the present invention.

Turning now to FIG. 9, an alternative approach to determining whether the resume condition is present is shown in greater detail at 70'. Specifically, an IP is determined at block 82 and block 90 provides for looking up the IP in an abbreviated tag array. Thus, method 70' can be implemented via the controller 42' discussed above (FIG. 4). Processing block 92 provides for determining whether the IP is present in the abbreviated array. It will be appreciated that the abbreviated tag array can be constructed from build data to identify a subset of all instructions, where the subset includes those instructions most likely to result in a trace cache hit. If the IP is found in the abbreviated tag array, a search is performed at block 84 in the trace cache for the IP. Thus, a subset of every instruction decoded by the decoder is searched for in the trace cache, resulting in potentially significant time savings.

Figure 10:
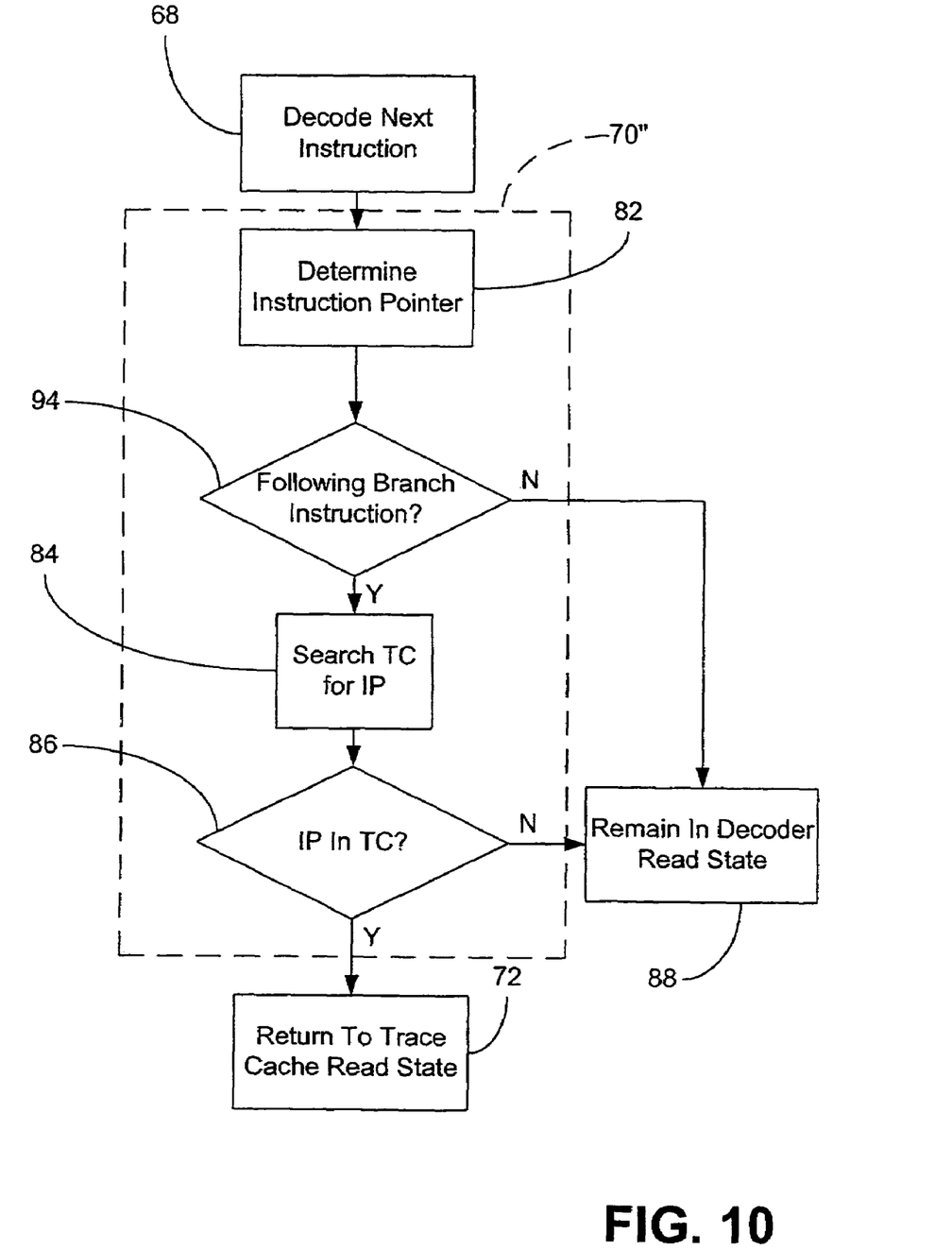
FIG. 10 is a flowchart of an example of a process of determining whether a resume condition is present in accordance with a second alternative embodiment of the present invention.

FIG. 10 shows another approach to determining whether the resume condition is present at block 70″ in greater detail. Generally, it can be seen that the subset of instructions is selected based on an instruction heuristic instead of a look-up to an abbreviated tag array. In the illustrated embodiment, block 94 provides for determining whether an immediately proceeding instruction was a branch instruction. If not, a trace cache search is conducted for the LIP. Otherwise, block 88 provides for remaining in the decoder reading state.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A system comprising:
   a memory;
   a decoder, coupled to the memory, to decode a first instruction into a plurality of operations; and
   a controller to pass a first copy of the operations from the decoder to a build engine associated with a trace cache, the controller to pass a second copy of the operations from the decoder directly to an allocation module, the operations bypassing the build engine and the allocation module being in a decoder reading state,
   the controller including control logic to determine whether a trace cache reading resume condition is present based on a second instruction before the second instruction leaves the decoder.

2. The system methed of claim 1 wherein the control logic is to switch the allocation module from the decoder reading state to a trace cache reading state responsive to the resume condition being present.

3. The system niethed of claim 2 wherein the control logic is to search the trace cache for an instruction pointer that corresponds to the second instruction.

4. The system methed of claim 3 wherein the control logic is to repeat the searching for every instruction decoded by the decoder.

5. The system niethed of claim 3 wherein the control logic is to repeat the searching for a subset of the every instruction decoded by the decoder.

6. The system methed of claim 5 wherein the controller further includes an abbreviate tag array, the control logic to select the subset based on a lookup of the abbreviated tag array.

7. The system of claim 5, wherein the controller further includes an instruction heuristic, the control to select the subset based on the instruction heuristic.

8. The system of claim 7, wherein the instruction heuristic is to determine whether an immediately preceding instruction was a branch instruction.

9. The system of claim 1, wherein the decoder and the controller are part of an application specific integrated circuit.

10. A processor instruction management system, comprising:
    means for decoding a first instruction into a plurality of operations with a decoder;
    means for passing a first copy of the operations from the decoder to a build engine associated with a trace cache;
    means for passing a second copy of the operations from the decoder directly to a back end allocation module, the operations bypassing the build engine and the allocation module being in a decoder reading state; and
    means for determining at the decoder whether a trace cache reading resume condition is present based on a second instruction, the determining being conducted before the second instruction leaves the decoder.

11. The processor instruction management system of claim 10 further including means for switching the allocation module from the decoder reading state to a trace cache reading state responsive to the resume condition being present.

12. The processor instruction management system of claim 11 further including means for searching the trace cache for an instruction pointer that corresponds to the second instruction.

13. The processor instruction management system of claim 12 further including means for repeating the searching for every subsequent instruction decoded by the decoder.

14. The processor instruction management system of claim 12 further including means for repeating the searching for a subset of every subsequent instruction decoded by the decoder.

15. The processor instruction management system of claim 14 further including means for selecting the subset based on a lookup to an abbreviated tag array.

16. The processor instruction management system of claim 14, further including means for selecting the subset based on an instruction heuristic.

17. The processor instruction management system of claim 16, further including means for determining whether an immediately preceding instruction was a branch instruction.

18. The processor instruction management system of claim 10, further including means for passing the second copy to a buffer of the allocation module.

\* \* \* \* \*

UNITED STATES PATENT AND TRADEMARK OFFICE
CERTIFICATE OF CORRECTION

PATENT NO. : 7,181,597 B2
APPLICATION NO. : 11/217707
DATED : February 20, 2007
INVENTOR(S) : Miller et al.

It is certified that error appears in the above-identified patent and that said Letters Patent is hereby corrected as shown below:

In column 5, at line 42, delete "methed".

In column 5, at line 46, delete "niethed".

In column 5, at line 49, delete "methed".

In column 5, at line 52, delete "niethed".

In column 5, at line 55, delete "methed".

Signed and Sealed this

Fifteenth Day of April, 2008

JON W. DUDAS
*Director of the United States Patent and Trademark Office*